(No Model.)

M. STEUDNER.
BIT.

No. 599,537. Patented Feb. 22, 1898.

Witnesses
A. J. Hadden
D. Haslett

Inventor
Martin Steudner
by his Attorney
A. J. Hadden

UNITED STATES PATENT OFFICE.

MARTIN STEUDNER, OF GERA, GERMANY.

BIT.

SPECIFICATION forming part of Letters Patent No. 599,537, dated February 22, 1898.

Application filed April 29, 1897. Serial No. 634,441. (No model.)

*To all whom it may concern:*

Be it known that I, MARTIN STEUDNER, a subject of the German Emperor, and a resident of Gera, Debschwitz, in the Empire of Germany, have invented certain new and useful Improvements in Bits and other Boring-Tools, of which the following is a specification.

In order to prevent a borer from losing its way, I provide its straight boring edges with one or more grooves. There will thus remain over the bore-hole bottom circular ridges which serve for guiding the farther-advancing borer, so that deflection is nearly impossible. In order to reproduce an edge of this kind by means of simple grinding, the borer is provided on its whole working length with a corresponding groove.

Figure 1:
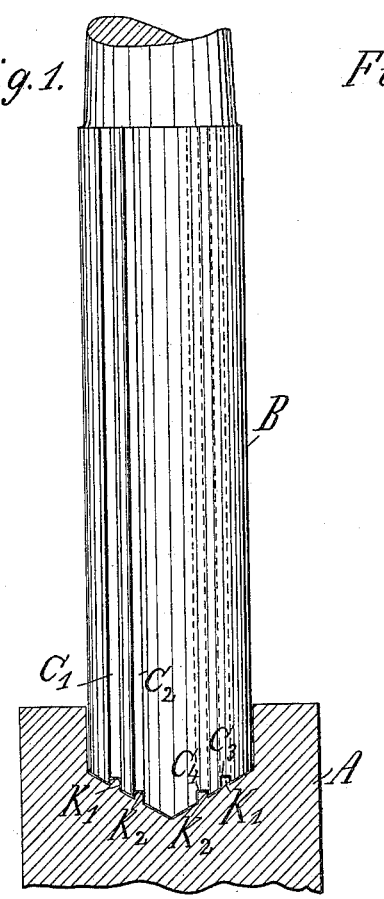
Figure 3:
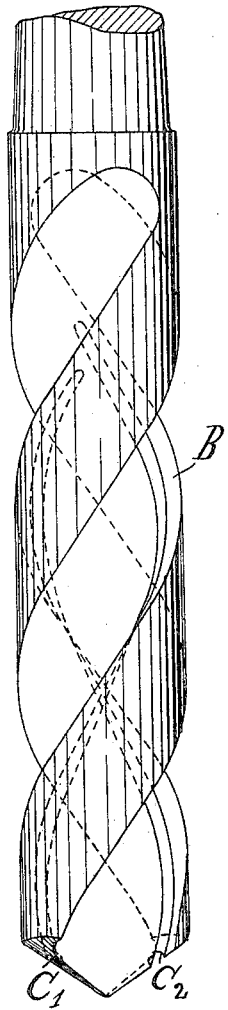
Figure 2:
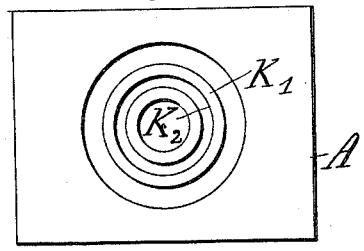
Figure 4:
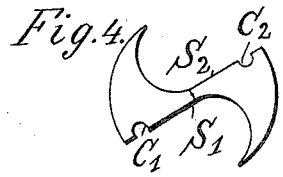

In the annexed drawings, Figure 1 shows a straight borer B with cylindrical mantle-face which has begun to bore its under layer A. By the grooves $C'$ and $C^3$ or $C^2$ and $C^4$, which generally are arranged in a corresponding manner, and which can be of any form, there are formed on the bottom of the bore-hole the two circular combs $K'$ or $K^2$, Figs. 1 and 2, which prevent the borer from escaping as soon as it has entered so far that its straight cutting edge arrives in action. Fig. 3 shows a twisted cylindrical borer B, which is provided with one groove $C'$ and $C^2$ on each of the two faces, on which the straight cutting edge $S'$ and $S^2$ is formed. These grooves can be arranged in a corresponding manner, so that on the bottom of the bore-hole a circular guiding-comb is formed. Fig. 4 shows the plan view of the borer. The straight cutting edges $S'$ and $S^2$ run nearly radially. Corresponding to the grooves $C'$ and $C^2$ and the greater strain toward the periphery, the cross-section is enlarged rearward, increasing from the axis toward the periphery.

By means of the straight cutting edges of this borer an equal cutting angle is secured for all points of the surfaces to be worked. The hollow grooves which cut the guiding-combs on the base will have a cutting effect with their edges lying obliquely to the bore direction, while the edges falling into the bore direction serve for guiding with a favorable cutting angle of the working straight edges. The borer will be less shaken by the guiding-combs, and thus the work will be facilitated and the working effect increased. The smaller shaking movement of the borer while it works allows of using a weaker shaft and gives a smoother bore-hole. Also in common bits the cutting edges can be provided with grooves for the purpose of guiding.

I claim as my invention—

A boring-bit having straight cutting edges, and provided in the faces toward the cutting edges with longitudinal grooves, whereby when the cutting end of the bit is ground off, notches are formed in the cutting ends, for the purpose of forming annular ridges in the bottom of the bore-hole made by the bit, the said grooves, at each side of the longitudinal central line of the bit being equal distances from said longitudinal central line, whereby the notches formed in the cutting end of the bit will also be equidistant, at each side, from the center of the end and preventing one side or half of the cutting end destroying the ridge formed in the bottom of the bore-hole, by the notches in the other side or half of the end of the bit, substantially as herein shown and described.

In witness whereof I have signed this specification in presence of two witnesses.

MARTIN STEUDNER.

Witnesses:
ERNST VOLLRATH,
RICHARD WAERBÜRGER.